United States Patent
Wang et al.

(10) Patent No.: US 9,959,484 B2
(45) Date of Patent: May 1, 2018

(54) METHOD AND APPARATUS FOR GENERATING IMAGE FILTER

(71) Applicant: Xiaomi Inc., Beijing (CN)

(72) Inventors: Baichao Wang, Beijing (CN); Zhijun Chen, Beijing (CN); Wendi Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 97 days.

(21) Appl. No.: 15/015,785

(22) Filed: Feb. 4, 2016

(65) Prior Publication Data

US 2016/0232426 A1 Aug. 11, 2016

(30) Foreign Application Priority Data

Feb. 11, 2015 (CN) .......................... 2015 1 0072609

(51) Int. Cl.
*G06K 9/00* (2006.01)
*G06K 9/62* (2006.01)
(Continued)

(52) U.S. Cl.
CPC .......... *G06K 9/6211* (2013.01); *G06K 9/4652* (2013.01); *G06K 9/481* (2013.01);
(Continued)

(58) Field of Classification Search
CPC .... G06K 9/00503; G06K 9/40; G06K 9/4609; G06K 9/4619; G06K 9/4623;
(Continued)

(56) References Cited

U.S. PATENT DOCUMENTS 7,079,710 B2 * 7/2006 Nagashima .......... G06K 9/4609
358/525
8,135,184 B2 * 3/2012 Steinberg ............. G06K 9/0061
382/103
(Continued)

FOREIGN PATENT DOCUMENTS

CN 102360506 A 2/2012
CN 102521807 A 6/2012
(Continued)

OTHER PUBLICATIONS

European Search Report dated Jun. 16, 2016 in European Patent Application No. EP 16 15 4544.
(Continued)

*Primary Examiner* — Jose Couso
(74) *Attorney, Agent, or Firm* — Oblon, McClelland, Maier & Neustadt, L.L.P.

(57) ABSTRACT

The present disclosure discloses a method and an apparatus for generating an image filter. The method includes receiving a first image that is selected with a specific imaging effect desired for the image filter, generating a group of images corresponding to the first image, wherein the group of images comprises at least a second image of a common structure characteristic with the first image and without the specific imaging effect, calculating a mapping relationship for transforming the group of images to the first image and storing the mapping relationship to be used as the image filter to generate the specific imaging effect on other images.

15 Claims, 6 Drawing Sheets

(51) Int. Cl.
*H04N 1/60* (2006.01)
*G06K 9/46* (2006.01)
*G06K 9/48* (2006.01)
*G06T 5/20* (2006.01)
*G06T 5/50* (2006.01)

(52) U.S. Cl.
CPC .................. *G06T 5/20* (2013.01); *G06T 5/50* (2013.01); *H04N 1/60* (2013.01); *G06T 2207/10024* (2013.01); *G06T 2207/20016* (2013.01); *G06T 2207/20024* (2013.01)

(58) Field of Classification Search
CPC .... G06K 9/4628; G06K 9/4652; G06K 9/623; G06K 9/741; G06K 9/743; G06K 9/745; G06K 9/746; G06K 9/748; G06K 9/6211; G06K 9/66; G06K 9/00234; G06K 9/6215; G06T 3/4015; G06T 5/002; G06T 5/005; G06T 5/10; G06T 5/20; G06T 5/50; G06T 7/277; G06T 7/44; G06T 2207/10024; G06T 2207/20004; G06T 2207/20008; G06T 2207/20012; G06T 2207/20016; G06T 2207/20024; G06T 2207/20028; G06T 2207/20032; G06T 2207/20182; G06T 5/00; G06T 11/60; G06T 2207/2008; G06T 11/0011; H04N 1/60; H04N 1/6086; H04N 5/72; H04N 9/3114; H04N 9/3117; H04N 9/407; H04N 9/646; H04N 9/78; H04N 13/0018; H04N 19/117; H04N 19/439; H04N 19/615; H04N 19/62; H04N 19/628; H04N 19/635; H04N 19/80; H04N 19/82; H04N 21/23418; H04N 21/454; H04N 21/4542; H04N 21/4545; H04N 2201/02493; H04N 2209/043; H04N 2209/045; H04N 1/3876; H04N 5/225; H04N 5/23222; H04N 5/23293; H04N 5/2621; H03H 17/0201–17/0202; H03H 17/0213; H03H 17/0216; H03H 17/0226–17/0685; H03H 2017/0072; H03H 2017/0081; H03H 2017/009; H03H 2017/0204–2017/021; H03H 2017/0214–2017/0692; H03H 21/0001; H03H 21/0012–21/00321
See application file for complete search history.

(56) References Cited

U.S. PATENT DOCUMENTS

| | | | |
|---|---|---|---|
| 8,824,824 B2* | 9/2014 | Okada | G06T 5/003 382/260 |
| 8,913,827 B1* | 12/2014 | Fang | G06T 11/001 382/162 |
| 9,076,066 B2 | 7/2015 | Zhu et al. | |
| 9,154,709 B2 | 10/2015 | Cohen et al. | |
| 9,508,130 B2* | 11/2016 | Yanai | G06T 5/003 |
| 2008/0279467 A1 | 11/2008 | Liu et al. | |
| 2010/0277491 A1* | 11/2010 | Hiratsuka | H04N 1/00161 345/581 |
| 2010/0322534 A1 | 12/2010 | Bolme et al. | |
| 2012/0033888 A1* | 2/2012 | Takamori | G06K 9/3241 382/190 |
| 2013/0242148 A1 | 9/2013 | Mlinar et al. | |
| 2014/0169672 A1 | 6/2014 | Zhu et al. | |
| 2014/0176732 A1* | 6/2014 | Cohen | H04N 5/23293 348/207.1 |
| 2015/0016720 A1 | 1/2015 | Vermeir | |

FOREIGN PATENT DOCUMENTS

| | | | |
|---|---|---|---|
| CN | 102651136 A | 8/2012 | |
| CN | 103870828 A | 6/2014 | |
| CN | 104700353 A | 6/2015 | |
| JP | 2014-67129 A | 4/2014 | |
| JP | 2015-11585 A | 1/2015 | |
| RU | 2 353 968 C2 | 4/2009 | |
| RU | 2 461 977 C2 | 9/2012 | |
| WO | WO 2006066845 A2 * | 6/2006 | G06T 5/002 |
| WO | WO 2014/100774 A1 | 6/2014 | |

OTHER PUBLICATIONS

International Search Report and Written Opinion dated Jan. 26, 2016 in PCT/CN2015/093400 (with English translation).
Office Action dated May 9, 2016 in Korean Patent Application No. 10-2016-7000127 (with English translation).
Office Action dated Jan. 30, 2017 in Russian Patent Application No. 2016107731/08(012238) filed on Oct. 30, 2015 (with English translation).
Erik Reinhard, et al., Color Transfer between Images, IEEE, 2001, XP55011470A, pp. 34-41.
Yiming Liu, et al., "AutoStyle: Automatic Style Transfer from Image collections to Users' Images", Eurographics Symposium on Rendering 2014, vol. 33, No. 4, 2014, XP55280477A, 12 pages.
Office Action dated Jul. 4, 2017, in Japanese Patent Application No. 2016-526183 (with English language translation).
Office Action dated May 19, 2017, in Chinese Patent Application No. 201510072609.4 (with English language translation).
Office Action dated Aug. 7, 2017, in European Patent Application No. 16 154 544.7.

* cited by examiner

METHOD AND APPARATUS FOR GENERATING IMAGE FILTER

CROSS-REFERENCE TO RELATED APPLICATIONS

This application is based upon and claims priority to Chinese Patent Application Serial No. 201510072609.4, filed on Feb. 11, 2015, the entire contents of which are incorporated herein by reference.

TECHNICAL FIELD

The present disclosure generally relates to a field of image processing technology, and more particularly, to a method and an apparatus for generating an image filter.

BACKGROUND

Presently, many image processing application programs provide the filter function. Most of these application programs provide a set of filters defined by professional designers, and the user may use these filters to process the image and thus change the style of the image. However, these filters are all pre-defined, and thus the user cannot modify these filters to achieve a desired effect.

In order to better satisfy the user, certain image processing application programs allow the user to adjust related parameters of the filter to obtain a self-defined filter, which may be used by the user for processing the image, thus obtaining an image with the effect of the self-defined filter.

SUMMARY

Aspects of the disclosure provide a method for generating an image filter. The method includes receiving a first image that is selected with a specific imaging effect for the image filter, generating a group of images corresponding to the first image, wherein the group of images comprises at least a second image of a common structure characteristic to the first image and without the specific imaging effect, calculating a mapping relationship for transforming the group of images to the first image and storing the mapping relationship to be used as the image filter to generate the specific imaging effect on other images.

To generate the group of images corresponding to the first image, in an example, the method includes calculating a first feature vector of the first image, obtaining a second feature vector of each sample image in an image library, the sample image being an image without the specific imaging effect, comparing the first feature vector with each second feature vector to determine, from the sample images, at least the second image of the common structure characteristic to the first image and forming the group of images including at least the second image.

To calculate the mapping relationship for transforming the group of images to the first image, in an example, the method includes calculating a first color mean value and a first color variance of pixels within each image in the group of images, calculating a second color mean value and a second color variance of pixels within the first image and generating the mapping relationship based on the first color mean value, the first color variance, the second color mean value, and the second color variance. In an example, the mapping relationship is generated according to:

$$\begin{cases} L = (vG\_l/vA\_l) \times (l - mA\_l) + mG\_l \\ A = (vG\_a/vA\_a) \times (l - mA\_a) + mG\_a \\ B = (vG\_b/vA\_b) \times (l - mA\_b) + mG\_b \end{cases}$$

where (l,a,b) denotes to a pixel value of a pixel before transforming, and (L,A,B) denotes to a pixel value of the pixel after transforming, (mG_l, mG_a, mG_b) denotes the first color mean value, (vG_l, vG_a, vG_b) denotes to the first color variance, (mA_l, mA_a, mA_b) denotes the second color mean value, (vA_l, vA_a, vA_b) denotes to the second color variance.

Further, in an embodiment, the method includes receiving a third image to be processed to have the specific imaging effect, and transforming each pixel in the third image according to the mapping relationship of the image filter to generate a processed image with the specific imaging effect.

In an embodiment, to compare the first feature vector with each second feature vector to determine, from the sample images, at least the second image of the common structure characteristic to the first image, the method includes calculating a distance between the first feature vector of the first image and a second feature vector of a sample image and determining the sample image of the common structure characteristic to the first image when the distance is smaller than a threshold.

To calculate the first feature vector of the first image further comprises, in an example, the method includes sub-sampling the first image to generate a pyramid representation of the first image at multiple scales, and calculating the first feature vector based on the pyramid representation.

Aspects of the disclosure provide an apparatus for generating an image filter. The apparatus includes a processor and a memory for storing instructions executable by the processor. Then the processor is configured to receive a first image that is selected with a specific imaging effect for the image filter, generate a group of images corresponding to the first image, wherein the group of images comprises at least a second image of common structure characteristic to the first image and without the specific imaging effect, calculate a mapping relationship for transforming the group of images to the first image, and store the mapping relationship to be used as the image filter in the memory.

Aspects of the disclosure provide a non-transitory computer-readable storage medium storing instructions that, when executed by a processor of a terminal device, causes the terminal device to perform a method for generating an image filter. The method includes receiving a first image that is selected with a specific imaging effect for the image filter, generating a group of images corresponding to the first image, wherein the group of images comprises at least a second image of common structure characteristic to the first image and without the specific imaging effect, calculating a mapping relationship for transforming the group of images to the first image; and storing the mapping relationship as the image filter to generate the specific imaging effect on other images.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
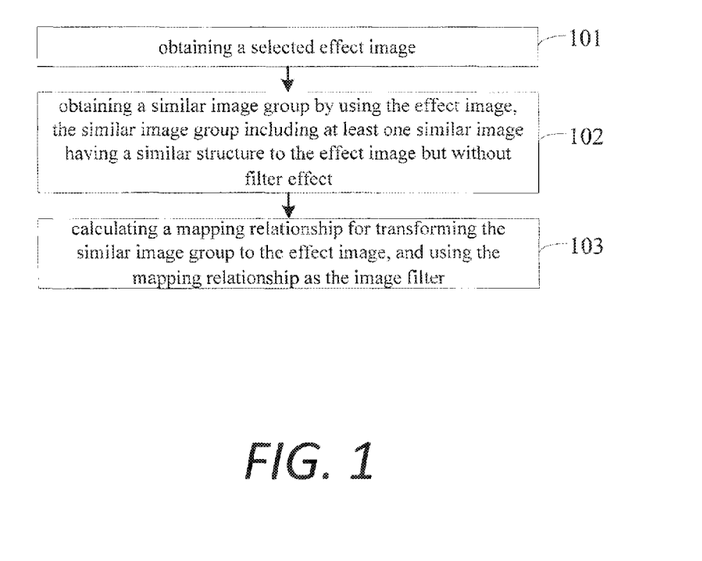
FIG. 1 is a flow chart showing a method for generating an image filter, according to an exemplary embodiment.

FIG. 1 is a flow chart showing a method for generating an image filter, according to an exemplary embodiment. The method for generating an image filter is used in an electronic device. The electronic device can be a smart phone, a tablet computer, a smart TV, an e-reader, a multimedia player, a laptop computer, a desk-top computer, etc. The method for generating an image filter includes the following steps.

In step 101, a selected effect image is obtained.

In step 102, a similar image group is obtained by using the effect image. The similar image group includes at least one similar image having a similar structure to the effect image but without filter effect. In an example, the similar image and the effect image are of common structure characteristic.

The similar structure herein means that the similar image and the effect image have a similar scene and/or similar composition structure. For example, a scene of the effect image mainly consists of a beach and an ocean, and characteristics of the composition structure of the effect image are that, a ratio of the beach to the ocean is 1:1, the beach is at a lower part of the effect image, while the ocean is at an upper part of the effect image. The obtained similar image having the similar structure to the effect image also has a beach and an ocean, a ratio of the beach to the ocean in the similar image is 1:1 or approaches 1:1, in the similar image, the beach is located at a lower part of the similar image, while the ocean is located at an upper part of the similar image.

In step 103, a mapping relationship for transforming the similar image group to the effect image is calculated, and the mapping relationship is used as the image filter.

In summary, the method for generating an image filter provided by the embodiment of the present disclosure includes obtaining the similar image group having the similar structure to the effect image, calculating the mapping relationship for transforming the similar image group to the effect image, and using the mapping relationship as the image filter. The generated image filter is a self-defined image filter that can achieve user desired imaging effect. The generated image filter achieves better accuracy of the user desired imaging effect than another self-defined image filter that is generated based on parameter adjustments by a user. The parameter adjustments based image filter has difficulty to achieve the user desired imaging effect due to user's lack of professional photography skills.

Figure 2A:
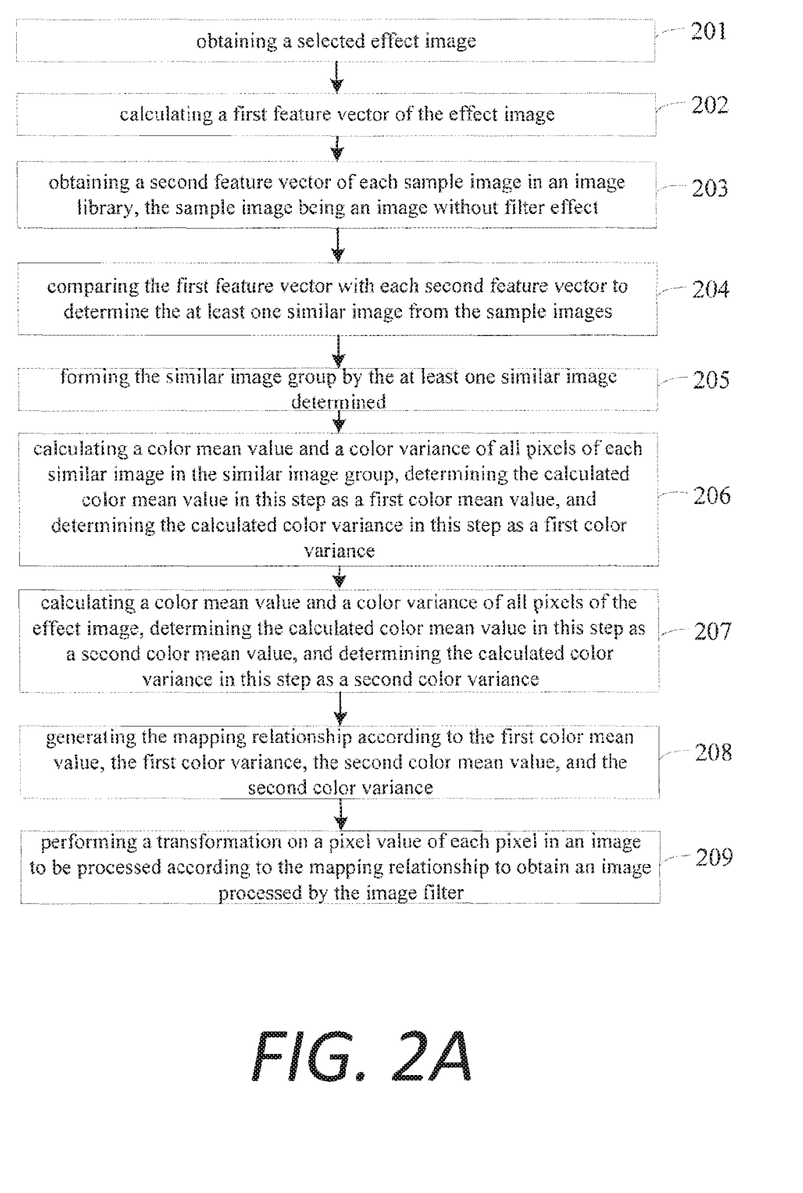
FIG. 2A is a flow chart showing a method for generating an image filter, according to another exemplary embodiment.

FIG. 2A is a flow chart showing a method for generating an image filter, according to another exemplary embodiment. The method for generating an image filter is used in an electronic device. The electronic device can be a smart phone, a tablet computer, a smart TV, an e-reader, a multimedia player, a laptop computer, a desk-top computer, etc. The method for generating an image filter includes the following steps.

In step 201, a selected effect image is obtained.

In an example, the effect image is selected by the user. For example, the effect image can be an image with filter effect photographed by a professional photographer, or can be an image with filter effect downloaded and saved by the user.

Generally, the filter effect (imaging effect) of the effect image is a user desired filter effect for applying on an image to be processed. The electronic device can generate an image filter according to the effect image, and processes the image to be processed using the image filter, so as to enable the image to be processed to achieve the filter effect of the effect image.

After obtaining the effect image, the electronic device can compare the effect image with sample images in an image library to determine a group of similar images having a similar spatial structure to the effect image but without the filter effect. Please refer to step 202 to step 205 below.

In step 202, a first feature vector of the effect image is calculated.

After obtaining the effect image, in an example, the electronic device can use a spatial pyramid matching algorithm to calculate the first feature vector of the effect image.

In an embodiment, the electronic device can repetitively sample the effect image with a reduced-order (e.g., down-sample, sub-sample) to obtain a series of images with different sizes. These sampled images are ranged from large to small and from bottom to top to form a pyramid model. The effect image forms a first layer of the pyramid model, and the image obtained by each time of reduced-order sampling forms one layer of the pyramid. After obtaining the pyramid model, the electronic device divides each layer of the pyramid model into blocks, and counts a feature histogram in each block. Finally, the blocks of the pyramid layers are combined into one feature vector, which is used as the first feature vector.

The first feature vector can be configured to indicate spatial structural information of the effect image. In an example, the spatial structural information mainly includes a scene and/or a composition structure of the effect image.

It should be noted that, because the feature vector obtained by the spatial pyramid matching algorithm comprises overall information and local information of the effect image, the feature vector can be used to indicate the spatial structural information of the effect image, and can also be used to classify and match the structural information of the effect image.

In step 203, a second feature vector of each sample image in an image library is obtained. In an example, the sample image is an image without the filter effect (imaging effect).

The image library can be stored in the electronic device, and can also be stored in a server, which is not restricted in this embodiment.

The image library includes a plurality of sample images covering a plurality of scenes, and these sample images do not have the filter effect.

In an embodiment, feature vectors respectively for sample images in the image library are pre-calculated and stored. In an example, the electronic device can directly read a feature vector of a sample image that is pre-calculated and stored, and use the feature vector of the sample image as a second feature vector.

In step 204, the first feature vector is compared respectively with the second feature vectors to determine the at least one similar image from the sample images.

After obtaining the first feature vector of the effect image and the second feature vector of each sample image, the electronic device can compare the first feature vector with the each second feature vector so as to determine the similar image having the similar structure to the effect image but without filter effect from these sample images.

Figure 2B:
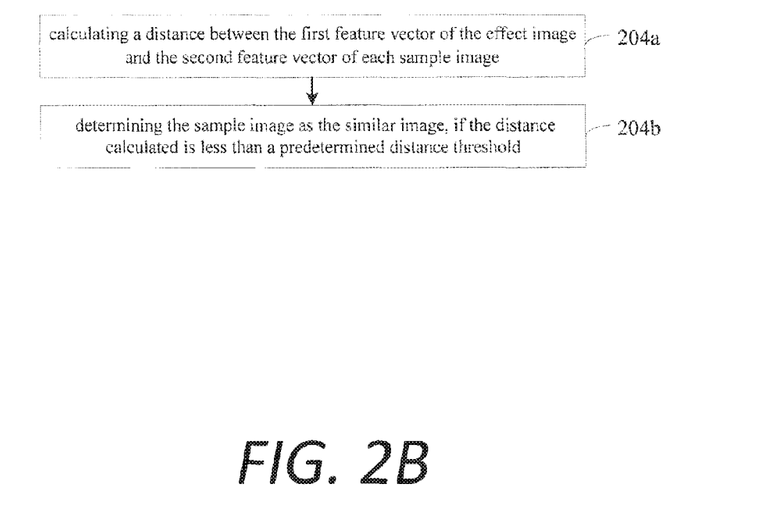
FIG. 2B is a flow chart showing a method for determining a similar image, according to an exemplary embodiment.

In an embodiment, a distance between the first feature vector of the effect image and the second feature vector of each sample image can be calculated to determine whether the sample image is a similar image. Please refer to the step 204a and step 204b below. FIG. 2B is a flow chart showing a method for determining a similar image, according to an exemplary embodiment.

In step 204a, for each sample image, a distance between the first feature vector of the effect image and the second feature vector of the sample image (e.g., Euclidean length between two vectors) can be calculated.

For each sample image, the electronic device calculates the distance between the second feature vector of the sample image and the first feature vector of the effect image, and the distance mentioned herein can be a Euclidean distance, a Manhattan distance, etc.

In step 204b, if the distance calculated is less than a predetermined distance threshold, then the sample image is determined as the similar image. In an example, when the distance is less than the predetermined distance threshold, the sample image and the effect image are determined of common structure characteristic. In other example, when the distance is less than the predetermined distance threshold, the sample image and the effect image can be classified in a same scene class.

If the calculated distance between the second feature vector of the sample image and the first feature vector of the effect image is less than the predetermined distance threshold, the electronic device determines the sample image as a similar image with the spatial structural similarity to the effect image but without filter effect.

It should be noted that, the less the distance between the second feature vector of the sample image and the first feature vector of the effect image is, the more similar the structure of the sample image is to that of the effect image.

In step 205, the at least one similar image determined forms the similar image group.

After determining all similar images in the image library, the electronic device may enable these similar images to form the similar image group and store the similar image group.

It should be noted that, step 202 to step 205 describe an algorithm of search by image of the similar image group obtained by comparing with the effect image. In practice, the electronic device can also use other algorithms of search by image to obtain the similar image having the similar structure to the effect image but without filter effect, which is not restricted in this embodiment.

Because the similar images in the similar image group obtained by comparing with the effect image have the similar spatial structure to the effect image, the mapping relationship for transforming the similar image group to the effect image can be calculated, and the mapping relationship can be used as the image filter for processing other images, such that the other images after being processed can have the filter effect of the effect image. Please refer to step 206 to step 209 as follows.

In step 206, a color mean value and a color variance of all pixels of each similar image in the similar image group are calculated, the calculated color mean value in this step is determined as a first color mean value, and the calculated color variance in this step is determined as a first color variance.

In an example, after obtaining the similar image group, the electronic device calculates the color mean value and the color variance of all pixels of each similar image in the similar image group, determines the calculated color mean value in this step as the first color mean value, and determines the calculated color variance in this step as the first color variance.

In step 207, a color mean value and a color variance of all pixels of the effect image are calculated, the calculated color mean value in this step is determined as a second color mean value, and the calculated color variance in this step is determined as a second color variance.

In step 208, the mapping relationship is generated according to the first color mean value, the first color variance, the second color mean value, and the second color variance.

After calculating the first color mean value, the first color variance, the second color mean value, and the second color variance, the electronic device can generate the mapping relationship for transforming the similar image group to the effect image according to these values, and use the flapping relationship as the image filter.

In an example, the mapping relationship is generated according to following expressions:

$$\begin{cases} L = (vG\_l / va\_l) \times (l - mA\_l) + mG\_l \\ A = (vG\_a / vA\_a) \times (l - mA\_a) + mG\_a \\ B = (vG\_b / vA\_b) \times (l - mA\_b) + mG\_b \end{cases}$$

where (l,a,b) denotes to a pixel value of a pixel before transforming, and (L,A,B) denotes to a pixel value of the pixel after transforming, (mG_l, mG_a, mG_b) denotes the first color mean value, (vG_l, vG_a, vG_b) denotes to the first color variance, (mA_l, mA_a, mA_b) denotes the second color mean value, (vA_l, vA_a, vA_b) denotes to the second color variance.

In the example, a pixel value of a pixel is represented using a Lab color space. It should be noted that, a pixel value of a pixel can be represented by other suitable color space.

In step 209, a transformation is performed on a pixel value of each pixel in an image to be processed according to the mapping relationship to obtain a processed image by the image filter.

After obtaining the mapping relationship for transforming the similar image group to the effect image, that is, after generating the image filter, the electronic device can perform the transformation on the pixel value of each pixel in the image to be processed according to the mapping relationship to obtain the processed image by the image filter. In this case, the processed image obtained by the electronic device is the image with the specific imaging effect as the effect image.

It should be noted that, step 206 to step 208 describe a specific algorithm of color migration for calculating the mapping relationship for transforming the similar image group to the effect image. In practice, the electronic device can use other suitable algorithms of color migration to obtain the mapping relationship for transforming the similar image group to the effect image, which is not restricted in this embodiment.

In summary, the method for generating an image filter provided by the embodiment of the present disclosure includes obtaining the similar image group having the similar structure to the effect image, calculating the mapping relationship for transforming the similar image group to the effect image, and using the mapping relationship as the image filter. In an example, the method further includes performing the transformation on the pixel value of each pixel in an image to be processed according to the mapping relationship to obtain the processed image by the image filter. The method can provide a self-defined filter to achieve the user desired effect. In a comparison example, a user adjusts parameters in a filter model to generate a self-defined filter. The parameter adjustment based self-defined filter can have a problem of failing to achieve the user desired effect due to the user's lack of professional photography skills. The image filter generated according to the embodiment can provide a self-defined filter of improved accuracy to achieve the user desired effect, and thus can solve the problem.

It should be noted that, the image filter can be generated using any suitable method such as a color transfer, a contract adjustment, a vignetting, etc. The color transfer method is used in the embodiment described above. In practice, the algorithm of color migration described in step 206 to step 208 of the above embodiment can be replaced by other suitable algorithms, such as a contract transfer algorithm, and the like, so as to realize different filter effects.

An apparatus embodiment of the present disclosure, which is used to execute the method embodiment of the present disclosure, will be described below. The details of the method embodiment performed by the apparatus embodiment are described above and will be omitted for clarity purposes.

Figure 3:
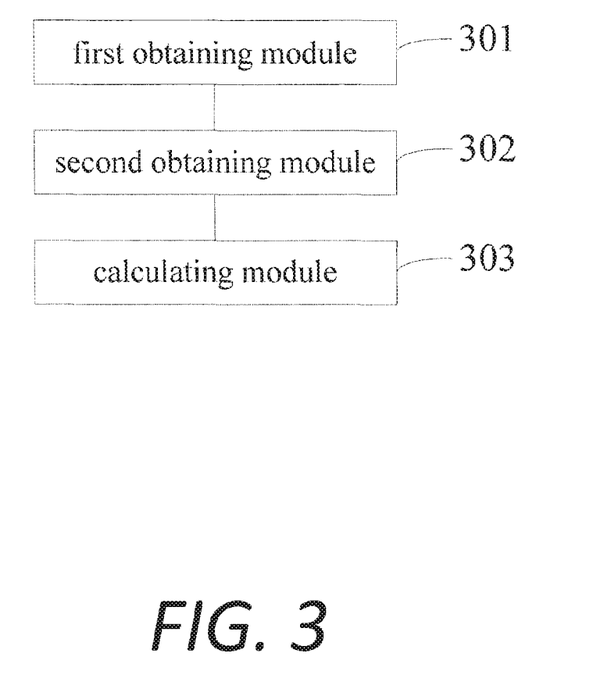
FIG. 3 is a block diagram illustrating an apparatus for generating an image filter according to an exemplary embodiment.

FIG. 3 is a schematic diagram illustrating an apparatus for generating an image filter, according to an exemplary embodiment. As shown in FIG. 3, the apparatus for generating an image filter is applied in an electronic device, which may be a smart phone, a tablet computer, a smart TV, an e-reader, a multimedia player, a laptop computer, a desk-top computer, etc. The apparatus for generating an image filter may include but be not limited to a first obtaining module 301, a second obtaining module 302 and a calculating module 303.

The first obtaining module 301 is configured to obtain a selected effect image with a specific imaging effect. In an example, the first obtaining module 301 receives an image selected by a user with a specific imaging effect that is desired by the user.

The second obtaining module 302 is configured to obtain a similar image group corresponding to the effect image. The similar image group includes at least one similar image having a similar spatial structure to the effect image but without the filter effect.

The calculating module 303 is configured to calculate a mapping relationship for transforming the similar image group obtained by the second obtaining module 302 to the effect image obtained by the first obtaining module 301, and to use the mapping relationship as the image filter.

In summary, the apparatus includes modules that are formed of hardware (e.g., circuitry) and software (e.g., instructions) components to generate an image filter according to the present disclosure. For example, the apparatus includes the first obtaining module 301 configured to obtain a selected effect image, the second obtaining module 302 configured to obtain the similar image group having the similar spatial structure to the effect image, and a calculating module configured to calculate the mapping relationship for transforming the similar image group to the effect image. The apparatus can further use the mapping relationship as the image filter to achieve the user desired imaging effect on other suitable images. The image filter provided by the apparatus according to the disclosure outperforms a parameter adjustments based self-defined filter with improved accuracy for the user desired imaging effect. The parameter adjustments based self-defined filter can fails to achieve the user desired imaging effect due to user's lack of professional photography skills.

Figure 4:
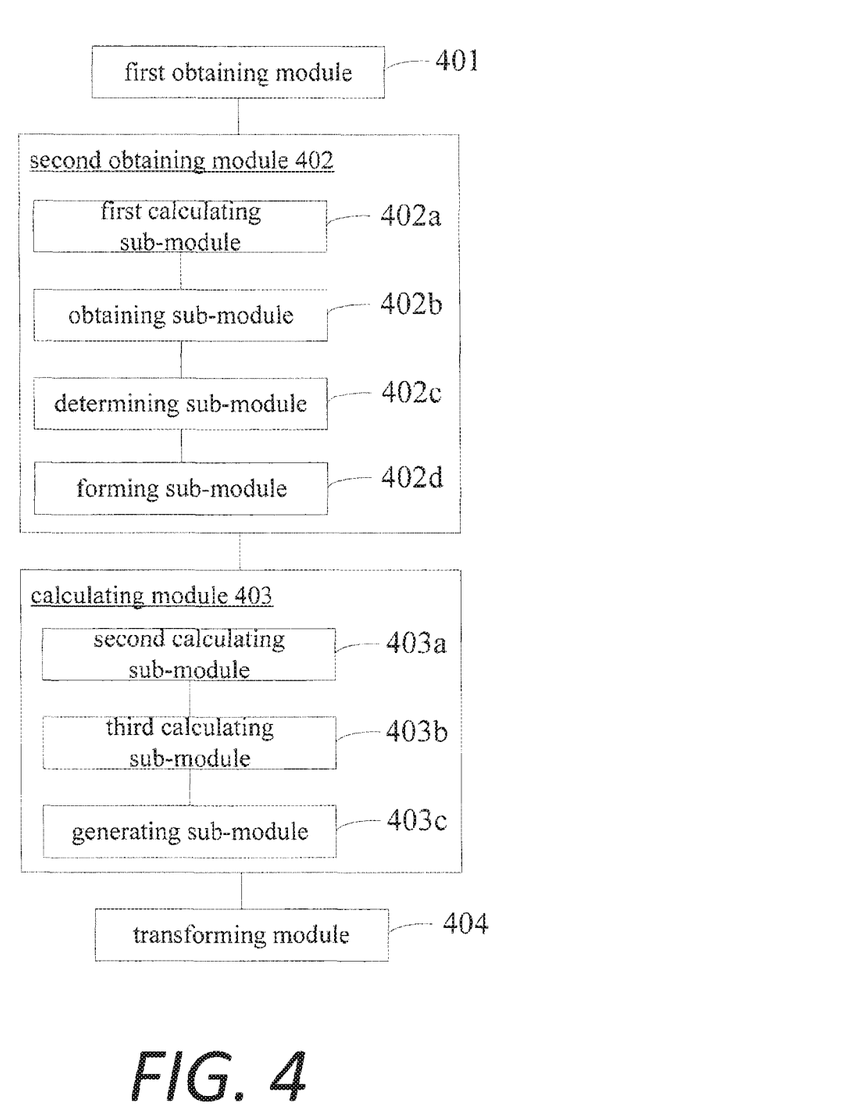
FIG. 4 is a block diagram illustrating an apparatus for generating an image filter according to another exemplary embodiment.

FIG. 4 is a schematic diagram illustrating an apparatus for generating an image filter, according to another exemplary embodiment. As shown in FIG. 4, the apparatus for generating an image filter is used in an electronic device, which can be a smart phone, a tablet computer, a smart TV, one-reader, a multimedia player, a laptop computer, a desk-top computer, etc. The apparatus for generating an image filter can include but not limited to a first obtaining module 401, a second obtaining module 402 and a calculating module 403.

The first obtaining module 401 is configured to obtain a selected effect image.

The second obtaining module 402 is configured to obtain a similar image group corresponding to the effect image. The similar image group includes at least one similar image having a similar spatial structure to the effect image but without filter effect.

The calculating module 403 is configured to calculate a mapping relationship for transforming the similar image group obtained by the second obtaining module 402 to the effect image obtained by the first obtaining module 401, and to use the mapping relationship as the image filter.

In a possible embodiment, the second obtaining module 402 can include: a first calculating sub-module 402a, an obtaining sub-module 402b, a determining sub-module 402c, and a forming sub-module 402d.

The first calculating sub-module 402a is configured to calculate a first feature vector based on the effect image.

The obtaining sub-module 402b is configured to obtain a second feature vector of each sample image in an image library. In an example, the sample images are images without filter effect.

The determining sub-module 402c is configured to compare the first feature vector obtained by the first calculating sub-module 402a with each second feature vector obtained by the obtaining sub-module 402b to determine the at least one similar image from the sample images.

The forming sub-module 402d is configured to form the similar image group by the at least one similar image determined by the determining sub-module 402c.

In a possible embodiment, the calculating module 403 may include: a second calculating sub-module 403a, a third calculating sub-module 403b and a generating sub-module 403c.

The second calculating sub-module 403a is configured to calculate a first color mean value and a first color variance for each similar image based on pixels of the similar image in the similar image group.

The third calculating sub-module 403b is configured to calculate a second color mean value and a second color variance for the effect image based on pixels of the effect image.

The generating sub-module 403c is configured to generate the mapping relationship according to the first color mean value, the first color variance, the second color mean value, and the second color variance.

In an example, the mapping relationship is generated according to following expressions:

$$\begin{cases} L = (vG\_l/vA\_l) \times (l - mA\_l) + mG\_l \\ A = (vG\_a/vA\_a) \times (l - mA\_a) + mG\_a \\ B = (vG\_b/vA\_b) \times (l - mA\_b) + mG\_b \end{cases}$$

where (l,a,b) denotes to a pixel value of a pixel before transforming, and (L,A,B) denotes to a pixel value of the pixel after transforming, (mG_l, mG_a, mG_b) denotes the first color mean value, (vG_l, vG_a, vG_b) denotes to the first color variance, (mA_l, mA_a, mA_b) denotes the second color mean value, (vA_l, vA_a, vA_b) denotes to the second color variance.

In a possible embodiment, the apparatus for generating an image filter can further include a transforming module 404.

The transforming module 404 is configured as the image filter to perform a transformation on a pixel value of each pixel in an image according to the mapping relationship to obtain a processed image with the imaging effect of the image filter.

In summary, the apparatus includes modules that are formed by software (e.g., instructions) and hardware (e.g., circuitry) components to generate an image filter according to the embodiment of the present disclosure. For example, the apparatus includes modules to obtain the similar image group having the similar structure to the effect image, calculate the mapping relationship for transforming the similar image group to the effect image, and use the mapping relationship as the image filter. Further, the apparatus can include modules to perform the transformation on the pixel value of each pixel in an image to according to the mapping relationship to output a processed image with the imaging effect of the image filter. The image filter provided by the apparatus according to the disclosure outperforms a parameter adjustments based self-defined filter with improved accuracy for the user desired imaging effect. The parameter adjustments based self-defined filter can fails to achieve the user desired imaging effect due to user's lack of professional photography skills.

With respect to the apparatus in the above embodiments, the specific manners for performing operations for individual modules therein have been described in detail in the embodiments regarding the methods, which will not be elaborated herein.

An embodiment of the present disclosure provides an apparatus for generating an image filter. The apparatus is implemented to perform the method disclosed herein for generating an image filter. The apparatus for generating an image filter includes: a processor; and a memory for storing instructions executable by the processor. The processor is configured to: obtain a selected effect image and obtain a similar image group corresponding to the effect image. The similar image group comprises at least one similar image having a similar spatial structure to the effect image but without filter effect. The processor is further configured to calculate a mapping relationship for transforming the similar image group to the effect image, and use the mapping relationship as the image filter.

Figure 5:
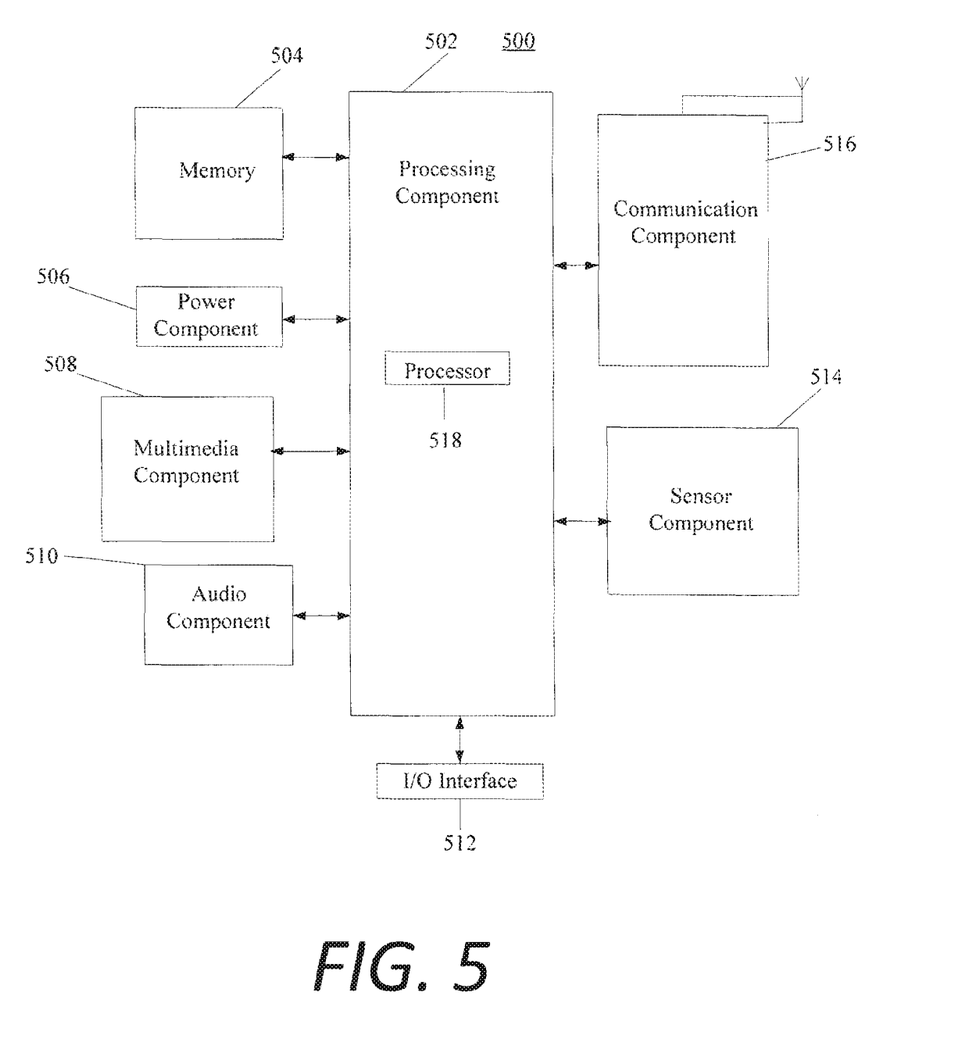
FIG. 5 is a schematic diagram illustrating an apparatus for generating an image filter, according to an exemplary embodiment.

FIG. 5 is a schematic diagram illustrating an apparatus for generating an image filter, according to an exemplary embodiment. For example, the apparatus 500 can be an electronic device, such as a mobile phone, a computer, a digital broadcast terminal, a messaging device, a gaming console, a tablet, a personal digital assistant, and the like.

Referring to FIG. 5, the apparatus 500 can include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the apparatus 500, such as the operations associated with display, telephone calls, data communications, camera operations, and recording operations. The processing component 502 can include one or more processors 518 to execute instructions to perform all or part of the steps in the above described methods. Moreover, the processing component 502 can include one or more modules which facilitate the interaction between the processing component 502 and other components. For instance, the processing component 502 can include a multimedia module to facilitate the interaction between the multimedia component 508 and the processing component 502.

The memory 504 is configured to store various types of data to support the operation of the apparatus 500. Examples of such data include instructions for any applications or methods operated on the apparatus 500, contact data, phonebook data, messages, pictures, video, etc. The memory 504 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 can include a power management system, one or more power sources, and any other components associated with the generation, management, and distribution of power in the apparatus 500.

The multimedia component 508 includes a screen providing an output interface between the apparatus 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and/or the rear camera can receive an external multimedia datum while the apparatus 500 is in an operation mode, such as a photographing mode or a video mode. Each of the front camera and the rear camera can be a fixed optical lens system or have focus and optical zoom capability.

The audio component 510 is configured to output and/or input audio signals. For example, the audio component 510 includes a microphone ("MIC") configured to receive an external audio signal when the apparatus 500 is in an operation mode, such as a call mode, a recording mode, and a voice recognition mode. The received audio signal can be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons can include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500, relative positioning of components, e.g., the display and the keypad, of the apparatus 500, a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 can include a proximity sensor configured to detect the presence of nearby objects without any physical contact. The sensor component 514 can also include a flat sensor, such as a CMOS or CCD image sensor, for use in imaging applications. In some embodiments, the sensor component 514 can also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 500 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for generating the image filter.

In exemplary embodiments, there is also provided a non-transitory computer-readable storage medium storing instructions, such as the memory 504 storing instructions. The instructions can be executed by the processor 518 in the apparatus 500, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit if the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for generating an image filter, wherein the method is applied in an electronic device, and the method comprises:
    receiving, by the electronic device, a first image that is selected with a specific imaging effect desired for the image filter;
    generating, by the electronic device, a group of images corresponding to the first image, wherein the group of images comprises at least a second image of a common structure characteristic with the first image and the second image does not have the specific imaging effect and is selected from an image library;
    calculating, by the electronic device, a mapping relationship for transforming the group of images to the first image; and
    storing, in the electronic device, the mapping relationship to be used as the image filter to generate the specific imaging effect on other images,
    wherein generating, by the electronic device, the group of images corresponding to the first image comprises:
        calculating, by the electronic device, a first feature vector of the first image;
        obtaining, by the electronic device, a second feature vector of each sample image in the image library, the sample images in the image library being images without the specific imaging effect;
        comparing, by the electronic device, the first feature vector with each second feature vector to determine, from the sample images, at least the second image of the common structure characteristic with the first image; and
        forming, by the electronic device, the group of images including at least the second image.

2. The method of claim 1, wherein calculating, by the electronic device, the mapping relationship for transforming the group of images to the first image, comprises:
    calculating, by the electronic device, a first color mean value and a first color variance of pixels within each image in the group of images;
    calculating, by the electronic device, a second color mean value and a second color variance of pixels within the first image; and
    generating, by the electronic device, the mapping relationship based on the first color mean value, the first color variance, the second color mean value, and the second color variance.

3. The method of claim 2, wherein the mapping relationship is generated by the electronic device as:

$$\begin{cases} L = (vG\_l/va\_l) \times (l - mA\_l) + mG\_l \\ A = (vG\_a/vA\_a) \times (l - mA\_a) + mG\_a \\ B = (vG\_b/vA\_b) \times (l - mA\_b) + mG\_b \end{cases}$$

where (l, a, b) denotes to a pixel value of a pixel before transforming, and (L, A, B) denotes to a pixel value of the pixel after transforming, (mG_l, mG_a, mG_b) denotes the first color mean value, (vG_l, vG_a, vG_b) denotes to the first color variance, (mA_l, mA_a, mA_b) denotes the second color mean value, (vA_l, vA_a, vA_b) denotes to the second color variance.

4. The method of claim 1, wherein comparing, by the electronic device, the first feature vector with each second feature vector to determine, from the sample images, at least the second image of the common structure characteristic to the first image further comprises:
calculating, by the electronic device, a distance between the first feature vector of the first image and a second feature vector of a sample image; and
determining, by the electronic device, the sample image of the common structure characteristic to the first image when the distance is smaller than a threshold.

5. The method of claim 1, wherein calculating, by the electronic device, the first feature vector of the first image further comprises:
sub-sampling, by the electronic device, the first image to generate a pyramid representation of the first image at multiple scales; and
calculating, by the electronic device, the first feature vector based on the pyramid representation.

6. An apparatus for generating an image filter, wherein the apparatus is included in an electronic device, and the apparatus comprises:
a processor; and
a memory for storing instructions executable by the processor;
wherein the processor is configured to:
receive a first image that is selected with a specific imaging effect desired for the image filter;
generate a group of images corresponding to the first image, wherein the group of images comprises at least a second image of a common structure characteristic with the first image and the second image does not have the specific imaging effect and is selected from an image library;
calculate a mapping relationship for transforming the group of images to the first image; and
store the mapping relationship to be used as the image filter in the memory,
wherein the processor is further configured to calculate a first feature vector of the first image, obtain a second feature vector of each sample image in the image library, the sample image being an image without the specific imaging effect, compare the first feature vector with each second feature vector to determine, from the sample images, at least the second image of the common structure characteristic with the first image, and form the group of images including at least the second image.

7. The apparatus of claim 6, wherein the processor is configured calculate a first color mean value and a first color variance of pixels within an image in the group of images, calculate a second color mean value and a second color variance of pixels within the first image and generate the mapping relationship based on the first color mean value, the first color variance, the second color mean value, and the second color variance.

8. The apparatus of claim 7, wherein the mapping relationship is generated according to:

$$\begin{cases} L = (vG\_l/vA\_l) \times (l - mA\_l) + mG\_l \\ A = (vG\_a/vA\_a) \times (l - mA\_a) + mG\_a \\ B = (vG\_b/vA\_B) \times (l - mA\_b) + mG\_b \end{cases}$$

where (l, a, b) denotes to a pixel value of a pixel before transforming, and (L, A, B) denotes to a pixel value of the pixel after transforming, (mG_l, mG_a, mG_b) denotes the first color mean value, (vG_l, vG_a, vG_b) denotes to the first color variance, (mA_l, mA_a, mA_b) denotes the second color mean value, (vA_l, vA_a, vA_b) denotes to the second color variance.

9. The apparatus of claim 6, wherein the processor is configured to calculate a distance between the first feature vector of the first image and a second feature vector of a sample image, and determine the sample image of the common structure characteristic to the first image when the distance is smaller than a threshold.

10. The apparatus of claim 6, wherein the processor is configured to sub-sample the first image to generate a pyramid representation of the first image at multiple scales, and calculate the first feature vector based on the pyramid representation.

11. A non-transitory computer-readable storage medium having stored therein instructions that, when executed by a processor of a terminal device, causes the terminal device to perform a method for generating an image filter, the method comprising:
receiving a first image that is selected with a specific imaging effect desired for the image filter;
generating a group of images corresponding to the first image, wherein the group of images comprises at least a second image of a common structure characteristic to the first image and the second image does not have the specific imaging effect and is selected from an image library;
calculating a mapping relationship for transforming the group of images to the first image; and
storing the mapping relationship as the image filter to generate the specific imaging effect on other images,
wherein generating the group of images corresponding to the first image comprises:
calculating a first feature vector of the first image;
obtaining a second feature vector of each sample image in the image library, the sample images in the image library being images without the specific imaging effect;
comparing the first feature vector with each second feature vector to determine, from the sample images, at least the second image of the common structure characteristic with the first image; and
forming the group of images including at least the second image.

12. The method of claim 1, further comprising:
receiving, by the electronic device, a third image to be processed with the specific imaging effect; and transforming, by the electronic device, each pixel in the third image according to the mapping relationship of the image filter to generate a processed image with the specific imaging effect.

13. The method of claim 2, further comprising:
receiving, by the electronic device, a third image to be processed with the specific imaging effect; and
transforming, by the electronic device, each pixel in the third image according to the mapping relationship of the image filter to generate a processed image with the specific imaging effect.

14. The apparatus of claim 6, wherein the processor is further configured to receive a third image to be processed with the specific imaging effect, and transform each pixel in the third image according to the mapping relationship of the image filter to generate a processed image with the specific imaging effect.

15. The apparatus of claim 7, wherein the processor is further configured to receive a third image to be processed with the specific imaging effect, and transform each pixel in the third image according to the mapping relationship of the image filter to generate a processed image with the specific imaging effect.

* * * * *